(12) United States Patent  (10) Patent No.: US 9,170,796 B2
Boden et al.  (45) Date of Patent: *Oct. 27, 2015

(54) CONTENT SPACE ENVIRONMENT REPRESENTATION

(71) Applicant: International Business Machines Corporation, Armonk, NY (US)

(72) Inventors: Edward B. Boden, Highland, NY (US); Anthony F. Pioli, Bedford, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/501,088

(22) Filed: Sep. 30, 2014

(65) Prior Publication Data

US 2015/0020072 A1  Jan. 15, 2015

Related U.S. Application Data

(63) Continuation of application No. 13/741,767, filed on Jan. 15, 2013.

(51) Int. Cl.
*G06F 7/00* (2006.01)
*G06F 17/00* (2006.01)
(Continued)

(52) U.S. Cl.
CPC .. *G06F 8/60* (2013.01); *G06F 8/10* (2013.01); *G06F 9/45558* (2013.01); *G06F 2009/4557* (2013.01)

(58) Field of Classification Search
CPC ............... G06F 8/24; G06F 8/10; G06F 8/34; G06F 8/35; G06F 8/31; G06F 8/70; G06F 11/3664; G06F 17/30303; G06F 21/606; G06F 21/6245; G06F 9/465; G06F 9/547; G06F 9/4443; G06F 9/44526; G06F 9/44505; G06F 8/20; G06F 8/60; G06F 17/30067; G06F 17/30867
See application file for complete search history.

(56) References Cited

U.S. PATENT DOCUMENTS 5,617,568 A * 4/1997 Ault et al. .................... 717/169
6,342,907 B1 1/2002 Petty et al.
(Continued)

FOREIGN PATENT DOCUMENTS

CA 2680978 A1 4/2010
CN 101833507 B 12/2011
(Continued)

OTHER PUBLICATIONS

European Examination Report for Application No. EP10776347.6—1957, dated Oct. 3, 2014, 6 pgs.
(Continued)

*Primary Examiner* — Don Wong
*Assistant Examiner* — Anibal Rivera
(74) *Attorney, Agent, or Firm* — Cantor Colburn LLP; William A. Kinnaman, Jr.

(57) ABSTRACT

Embodiments of the invention relate to content space environment representation. An aspect of the invention includes selecting one or more platform attributes for a software content space. The software content space includes one or more noun spaces. A platform space is created for each noun space in the software content space. The platform space is compatible with the noun space. A set of user stories is generated on a computer using the software content space and platform specification compatible with existing content space system specifications.

12 Claims, 3 Drawing Sheets

(51) Int. Cl.
*G06F 15/173* (2006.01)
*G06F 9/44* (2006.01)
*G06F 3/00* (2006.01)
*G06F 9/46* (2006.01)
*G06F 13/00* (2006.01)
*G06F 9/445* (2006.01)
*G06F 9/455* (2006.01)

(56) References Cited

U.S. PATENT DOCUMENTS

| | | | |
|---|---|---|---|
| 6,367,077 B1 | 4/2002 | Brodersen et al. | |
| 6,536,036 B1 | 3/2003 | Pavela | |
| 6,799,718 B2 | 10/2004 | Chan et al. | |
| 6,910,041 B2 | 6/2005 | Exton et al. | |
| 7,000,184 B2 | 2/2006 | Matveyenko et al. | |
| 7,127,707 B1 | 10/2006 | Mishra et al. | |
| 7,139,737 B2 | 11/2006 | Takahashi et al. | |
| 7,149,699 B2 | 12/2006 | Barnard et al. | |
| 7,210,066 B2 | 4/2007 | Mandava et al. | |
| 7,272,752 B2 | 9/2007 | Farchi et al. | |
| 7,467,198 B2 | 12/2008 | Goodman et al. | |
| 7,467,202 B2 | 12/2008 | Savchuk | |
| 7,503,037 B2 | 3/2009 | Banerjee et al. | |
| 7,509,626 B1 | 3/2009 | Barnes et al. | |
| 7,512,957 B2* | 3/2009 | Cohen et al. | 719/328 |
| 7,530,057 B2 | 5/2009 | Babcock | |
| 7,555,742 B2 | 6/2009 | Iborra et al. | |
| 7,562,338 B2* | 7/2009 | Knutson et al. | 717/101 |
| 7,581,205 B1* | 8/2009 | Massoudi | 717/106 |
| 7,587,636 B2 | 9/2009 | Tillmann et al. | |
| 7,617,479 B2* | 11/2009 | Hambrick et al. | 717/104 |
| 7,752,606 B2 | 7/2010 | Savage | |
| 7,761,591 B2 | 7/2010 | Graham | |
| 7,778,899 B2 | 8/2010 | Scumniotales et al. | |
| 7,788,238 B2* | 8/2010 | Gabriel et al. | 707/695 |
| 7,861,178 B2 | 12/2010 | Lui et al. | |
| 7,904,890 B1 | 3/2011 | Hsieh et al. | |
| 7,979,796 B2 | 7/2011 | Williams et al. | |
| 8,006,222 B2 | 8/2011 | Ruhe | |
| 8,032,860 B2 | 10/2011 | Piehler et al. | |
| 8,037,453 B1* | 10/2011 | Zawadzki | 717/123 |
| 8,069,435 B1* | 11/2011 | Lai | 717/106 |
| 8,104,018 B2 | 1/2012 | Chessell et al. | |
| 8,112,814 B2 | 2/2012 | Shimizu | |
| 8,347,263 B1 | 1/2013 | Offer | |
| 8,407,669 B2 | 3/2013 | Yee et al. | |
| 8,429,708 B1 | 4/2013 | Tandon | |
| 8,458,646 B2 | 6/2013 | Knutson et al. | |
| 8,566,779 B2 | 10/2013 | Sukhenko et al. | |
| 8,577,937 B1 | 11/2013 | Offer | |
| 8,645,341 B2 | 2/2014 | Salman et al. | |
| 8,645,907 B2 | 2/2014 | Jain et al. | |
| 8,701,078 B1 | 4/2014 | Holler et al. | |
| 8,707,248 B2 | 4/2014 | Sawant et al. | |
| 8,875,088 B1 | 10/2014 | Holler et al. | |
| 2001/0013024 A1 | 8/2001 | Takahashi et al. | |
| 2002/0016953 A1 | 2/2002 | Sollich | |
| 2002/0111808 A1 | 8/2002 | Feinberg | |
| 2002/0124072 A1* | 9/2002 | Tormasov et al. | 709/223 |
| 2002/0149614 A1* | 10/2002 | Biebesheimer et al. | 345/738 |
| 2002/0165912 A1 | 11/2002 | Wenocur et al. | |
| 2002/0178360 A1 | 11/2002 | Wenocur et al. | |
| 2002/0194483 A1 | 12/2002 | Wenocur et al. | |
| 2002/0194501 A1 | 12/2002 | Wenocur et al. | |
| 2002/0199001 A1 | 12/2002 | Wenocur et al. | |
| 2002/0199096 A1 | 12/2002 | Wenocur et al. | |
| 2003/0009694 A1 | 1/2003 | Wenocur et al. | |
| 2003/0041110 A1 | 2/2003 | Wenocur et al. | |
| 2003/0056173 A1 | 3/2003 | Copenhaver et al. | |
| 2003/0074648 A1* | 4/2003 | Brassard et al. | 717/104 |
| 2003/0093716 A1 | 5/2003 | Farchi et al. | |
| 2003/0121011 A1 | 6/2003 | Carter | |
| 2004/0143811 A1 | 7/2004 | Kaelicke et al. | |
| 2004/0204970 A1 | 10/2004 | Boden et al. | |
| 2005/0039045 A1* | 2/2005 | Wheeler | 713/201 |
| 2005/0044197 A1* | 2/2005 | Lai | 709/223 |
| 2005/0055399 A1 | 3/2005 | Savchuk | |
| 2005/0114331 A1 | 5/2005 | Wang et al. | |
| 2005/0114771 A1 | 5/2005 | Piehler et al. | |
| 2005/0114830 A1 | 5/2005 | Knutson et al. | |
| 2005/0144529 A1 | 6/2005 | Gotz et al. | |
| 2005/0160405 A1 | 7/2005 | Lunia et al. | |
| 2006/0036935 A1* | 2/2006 | Warner et al. | 715/500 |
| 2006/0048097 A1* | 3/2006 | Doshi | 717/120 |
| 2006/0074732 A1* | 4/2006 | Shukla et al. | 705/8 |
| 2006/0150200 A1 | 7/2006 | Cohen et al. | 719/328 |
| 2006/0230410 A1* | 10/2006 | Kurganov et al. | 719/311 |
| 2006/0287959 A1 | 12/2006 | Blecken | |
| 2007/0005300 A1 | 1/2007 | Haggerty et al. | |
| 2007/0006160 A1 | 1/2007 | Kunz et al. | |
| 2007/0156693 A1 | 7/2007 | Soin et al. | |
| 2007/0168918 A1 | 7/2007 | Metherall et al. | |
| 2007/0250815 A1 | 10/2007 | Bendapudi et al. | |
| 2008/0027742 A1 | 1/2008 | Maeda | |
| 2008/0066071 A1 | 3/2008 | Jain et al. | |
| 2008/0102422 A1 | 5/2008 | Hayes et al. | |
| 2008/0120602 A1 | 5/2008 | Comstock et al. | |
| 2008/0148253 A1 | 6/2008 | Badwe et al. | |
| 2008/0229278 A1 | 9/2008 | Liu et al. | |
| 2008/0244557 A1 | 10/2008 | Yeung et al. | |
| 2008/0263505 A1 | 10/2008 | StClair et al. | |
| 2008/0270981 A1 | 10/2008 | Hutchison et al. | |
| 2009/0031286 A1 | 1/2009 | Yee et al. | |
| 2009/0037912 A1 | 2/2009 | Stoitsev et al. | |
| 2009/0119779 A1 | 5/2009 | Dean et al. | |
| 2009/0259985 A1 | 10/2009 | Knutson et al. | |
| 2009/0271319 A1 | 10/2009 | Bromley et al. | |
| 2009/0271760 A1 | 10/2009 | Ellinger | |
| 2010/0169862 A1* | 7/2010 | Wolf et al. | 717/117 |
| 2010/0180258 A1 | 7/2010 | Takahashi | |
| 2010/0228683 A1 | 9/2010 | Ansley et al. | |
| 2010/0229150 A1* | 9/2010 | Stone et al. | 717/104 |
| 2010/0251379 A1 | 9/2010 | Myers et al. | |
| 2010/0269095 A1 | 10/2010 | King et al. | |
| 2010/0313179 A1* | 12/2010 | Groves et al. | 717/101 |
| 2011/0066420 A1 | 3/2011 | Bassin et al. | |
| 2011/0088014 A1* | 4/2011 | Becker et al. | 717/125 |
| 2011/0131134 A1 | 6/2011 | Ferris et al. | |
| 2011/0131315 A1 | 6/2011 | Ferris et al. | |
| 2011/0138358 A1 | 6/2011 | Rau et al. | |
| 2011/0154378 A1* | 6/2011 | Kishan et al. | 719/328 |
| 2011/0239227 A1* | 9/2011 | Schaefer et al. | 719/313 |
| 2011/0246540 A1 | 10/2011 | Salman et al. | |
| 2011/0264649 A1 | 10/2011 | Hsiao et al. | |
| 2011/0295701 A1 | 12/2011 | Phan | |
| 2012/0005209 A1 | 1/2012 | Rinearson et al. | |
| 2012/0005692 A1* | 1/2012 | Bulko et al. | 719/328 |
| 2012/0011455 A1 | 1/2012 | Subramanian et al. | |
| 2012/0054250 A1 | 3/2012 | Williams et al. | |
| 2012/0158527 A1 | 6/2012 | Cannelongo et al. | |
| 2012/0158669 A1* | 6/2012 | Morsi et al. | 707/689 |
| 2012/0159441 A1 | 6/2012 | Ghaisas | |
| 2012/0174194 A1 | 7/2012 | Furukawa | |
| 2012/0210243 A1 | 8/2012 | Uhma et al. | |
| 2012/0246609 A1 | 9/2012 | Boden et al. | |
| 2012/0246611 A1 | 9/2012 | Sawant et al. | |
| 2012/0291010 A1 | 11/2012 | Hutchison et al. | |
| 2012/0304248 A1 | 11/2012 | Watts et al. | |
| 2012/0311003 A1* | 12/2012 | Kuznetsov et al. | 707/827 |
| 2013/0024847 A1 | 1/2013 | Browne et al. | |
| 2013/0061200 A1 | 3/2013 | Roberts et al. | |
| 2013/0216205 A1 | 8/2013 | Suri et al. | |
| 2013/0326637 A1 | 12/2013 | Fang et al. | |
| 2014/0013440 A1 | 1/2014 | Thakur et al. | |
| 2014/0053127 A1 | 2/2014 | Madison et al. | |

(56) References Cited

U.S. PATENT DOCUMENTS

2014/0123107 A1     5/2014   Rajagopalan
2014/0201704 A1     7/2014   Boden et al.
2015/0020053 A1     1/2015   Boden et al.

FOREIGN PATENT DOCUMENTS

JP      2006195529 A     7/2006
KR         823227 B1     4/2008
WO      2011031328 A2    3/2011

OTHER PUBLICATIONS

Achim D. Brucker et al., "HOL-TestGen An Interactive Test-case Generation Framework,"; M. Chechik and M. Wirsing (Eds.): FASE 2009, LNCS 5503, pp. 417-420, 2009.

Anonymous, "Standardization for the Configuration of Heterogeneous Platforms Through Schema-Based Platform Tag Definitions", IP.com IPCOM000020720D, Dec. 10, 2003, pp. 1-5.

Huaikou Miao et al., "An Approach to Generating Test Cases for Testing Component-based Web Applications,"; Workshop on Intelligent Information Technology Application, Dec. 2-3, 2007, p. 264-269.

IBM, "Method and System for Dynamically Unloading and Loading Software Applications from a Peer-to-Peer Platform", IP.com IPCOM000193302D, Feb. 18, 2010, pp. 1-3.

International Search Report and Written Opinion: International Application No. PCT/IB2014/058076, International filed: Jan. 6, 2014; Date of mailing Apr. 21, 2014; 10 Pgs.

L. Chung et al., "On Non-Functional Requirements in Software Engineering," Lecture Notes in Computer Science, v.5600, pp. 363-379, 2009.

Wei Yu, "Refactoring Use Case Models on Episodes," Thesis, Dept. of Computer Science, Concordia Univ., Montreal, Quebec, Mar. 2004; 97 pgs.

Yara, P, et al. "Global Software Development with Cloud Platforms", Gotel, O. et al. (eds): SEAFOOD 2009, LNBIP 35, pp. 81-95, 2009.

Leffingwell, "A Rally Software Development Corporation Whitepaper—Agile Software Development with Verification and Validation in . . . "; 2011, [retrieved Feb. 3, 3026]; retrieved fm internet <URL:http://www.ultertechnologies.com/docs/agile.pdf> 33 pgs.

* cited by examiner

CONTENT SPACE ENVIRONMENT REPRESENTATION

DOMESTIC PRIORITY

This application is a continuation application of the legally related U.S. Ser. No. 13/741,767 filed Jan. 15, 2013, the contents of which are incorporated by reference herein in their entirety.

BACKGROUND

This invention relates generally to processing within a computing environment, and more particularly to the content space representation of physical and software prerequisites of a software application, component or system.

The disciplines involved across activities of software development such as architecture, physical and logical design, interface design, programming and unit test, function verification test, and the project management of all of these activities benefits from a having a complete description of the software under development. Although a complete description of a system under development is ideal, the various individuals involved in the software development process often do not operate at the same level of abstraction. I.e., business users may be able to define the goals of the application, but may not be able to articulate them at the level of detail that a software developer needs in order to complete a project. Similarly, software development experts may understand the application's code, but may not able to provide testers with the information they need to properly build and perform tests.

The disciplines involved across the activities of software development, such as architecture, physical and logical design, interface design, programming and unit testing, function verification testing, and the project management of all of these activities, benefits from a having a complete description of the software under development.

SUMMARY

An embodiment includes a system for content space environment representation. The system includes a computer processor and a content space environment representation module. The content space environment representation module is executable by the computer processer. The system is configured to perform a method. The method includes selecting one or more platform attributes for a software content space. The software content space includes one or more noun spaces. A platform space is created for each noun space in the software content space. The platform space is compatible with the noun space. A set of user stories is generated using the software content space and platform specification compatible with existing content space system specifications.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
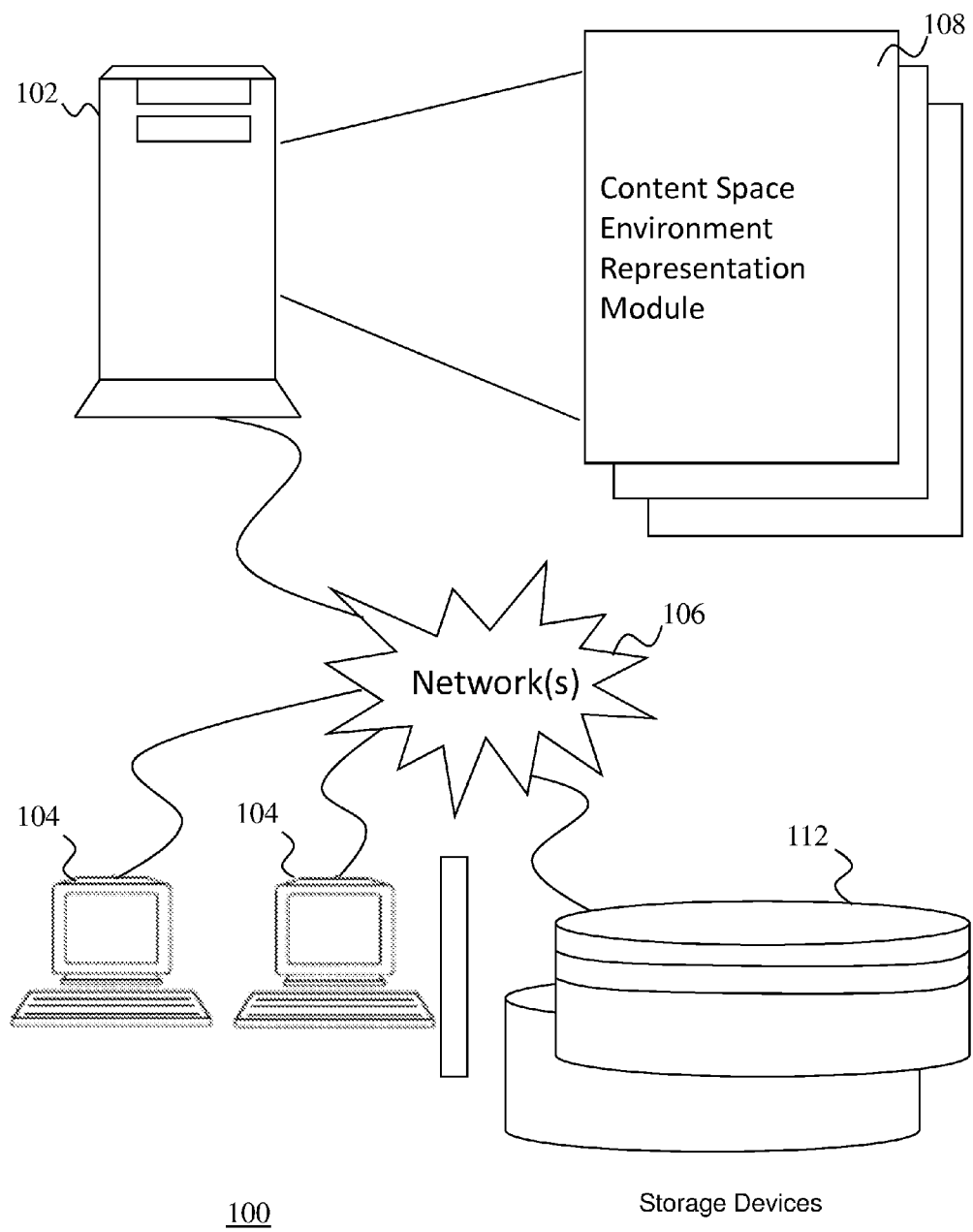
FIG. 1 depicts a schematic diagram of a system content space environment representation for automated code coverage measurement and tracking per user story and requirement that may be implemented by an embodiment.

An embodiment of the present invention provides for the representation of the content space environment.

In an embodiment, a set of platform attributes are selected as important for the software described by the content space and are used to create a platform space. The platform space is used to as part of the content space to generate platform specifications (per the requirements) for each user story. The platform specification is a string and compatible with current content space management systems.

In summary, a content space is a way of representing software content from an outside-in perspective via a set of dimensions. Each of the content space dimensions has values defined in terms of the software itself that concern a particular aspect, such as information abstraction, function, external interface and run-time environment. The dimension values can represent existing content and also new content for the software, based on requirements (via content space analysis) for a new release. The content space can be programmatically traversed, and as this traversal occurs, end-to-end testable units (termed user stories) are output, each corresponding to a particular region of the content space and having content space coordinates (a benefit). The set of all output user stories partitions the software content and the set of all new and changed user stories partitions the release requirements (a key benefit). The set of all user stories and various subsets (e.g. all power user stories) are used to compute the content coverage metric of various scopes.

A software content space is best used during the requirements gathering and definition phases of software development. From there it naturally augments the architecture description and in parallel is used to build the plans for staffing the development team. Development cost estimates based on prior release content spaces is another benefit. Design decomposition is improved by use of the content space and subsequent design integrity checking and reviews are improved. Project management is directly aided by the using the Content Space to generate user stories for use in a project planning system. And in the testing phases of development, the Content Space is used for tracking and as the basis for automated quality measurement.

A content space is a means of rigorously and systematically representing the entire content of a software product as experienced by its clients and users. The content space does this by defining a traversable coordinate system such that a discrete region (also referred to as a cell) of a five-dimensional space, which constitutes what is termed a use case or a user story. The five dimensions of the space are a noun, a verb, an interface, a platform and a timeline or release. Hence, systematic traversal of a content space results in an enumeration of all contained use cases and/or user stories.

An example of a use case for an email application is "send email." Generally, a use case is a function (i.e., a verb) executed for some information abstraction (i.e., a noun). A use case is composed of multiple user stories which define additional specifics such as interfaces and platforms. Some example user stories within the "send email" use case are: "send email via browser," "send email via GUI using Microsoft Outlook®," "send email via browser using Notes®," etc. The platform dimension defines the content space environment and includes the software, operating system, hardware, virtualization system, storage system, etc. that the verb and noun will be executed on as defined by the use case or user story. Any set of externalities relevant to the software can be included as attributes for the platform dimension.

The values for the platform dimension are free-form alpha numeric strings that may have embedded blanks and other special characters. However, unlike the other dimensions, the platform dimension is distinctly more involved. This is because the platform dimension may encompass more complexity than the other dimensions for some software products. For example, the platform dimension is used to encompass aspects of a modern system infrastructure such as the operating system (OS), a software application executing on the OS, hypervisor (if any), guest OS (if any), platform management element (if any), database server (if any), browser (if any), storage devices and systems (if any), fiber channel environment (if any), networking, and network virtualization (if any), etc. Storing all of these values in a single freeform string leads to confusion, and creates an inherent lack of standardization.

An embodiment of the present invention includes a way to support transparency and standardization for the platform dimension using a flexible and expandable system of defining platforms that is compatible with current user story systems.

Turning now to FIG. 1, a system 100 for implementing content space environment representation with environment dimension will now be described. In an embodiment, the system 100 includes a host system computer 102 executing computer instructions for implementing automated code coverage measurement and tracking per user story and requirement. Host system computer 102 may operate in any type of environment that is capable of executing a software application. Host system computer 102 may comprise a high-speed computer processing device, such as a mainframe computer, to manage the volume of operations governed by an entity for which the content space environment representation system is executing. In an embodiment, the host system computer 102 is part of an enterprise (e.g., a commercial business) that implements the automated code coverage measurement and tracking per user story and requirement.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the content space environment representation system described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of automated code coverage measurement and tracking per user story and requirement. Alternatively, a separate storage device (e.g., one or more storage devices 112) may be implemented for this purpose.

In an embodiment, the one or more storage devices 112 includes a data repository with data relating to content space environment representation by the system 100, as well as other data/information desired by the entity representing the host system computer 102 of FIG. 1. The one or more storage devices 112 is logically addressable as a consolidated data source across a distributed environment that includes networks 106. Information stored in the one or more storage devices 112 may be retrieved and manipulated via the host system computer 102 and/or the client systems 104. In an embodiment, the one or more storage devices 112 includes one or more databases containing, e.g., content space environment representation system data and corresponding configuration parameters, values, methods, and properties, as well as other related information as will be discussed more fully below. It will be understood by those of ordinary skill in the art that the one or more storage devices 112 may also comprise other structures, such as an XML file on the file system or distributed over a network (e.g., one of networks 106), or from a data stream from another server located on a network 106. In addition, all or a portion of the one or more storage devices 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the automated code coverage measurement and tracking per user story and requirement. The host system computer 102 includes one or more content space environment representation modules 108.

As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions. In an embodiment, the content space environment representation system executes on the same host computer system that executes the application that is being tested. In other embodiments, the content space environment representation system is executed on a separate computer system from the application that is being tested.

It will be understood that the content space environment representation system described in FIG. 1 may be implemented in hardware, software executing on a general purpose computer, or a combination thereof.

Figure 2:
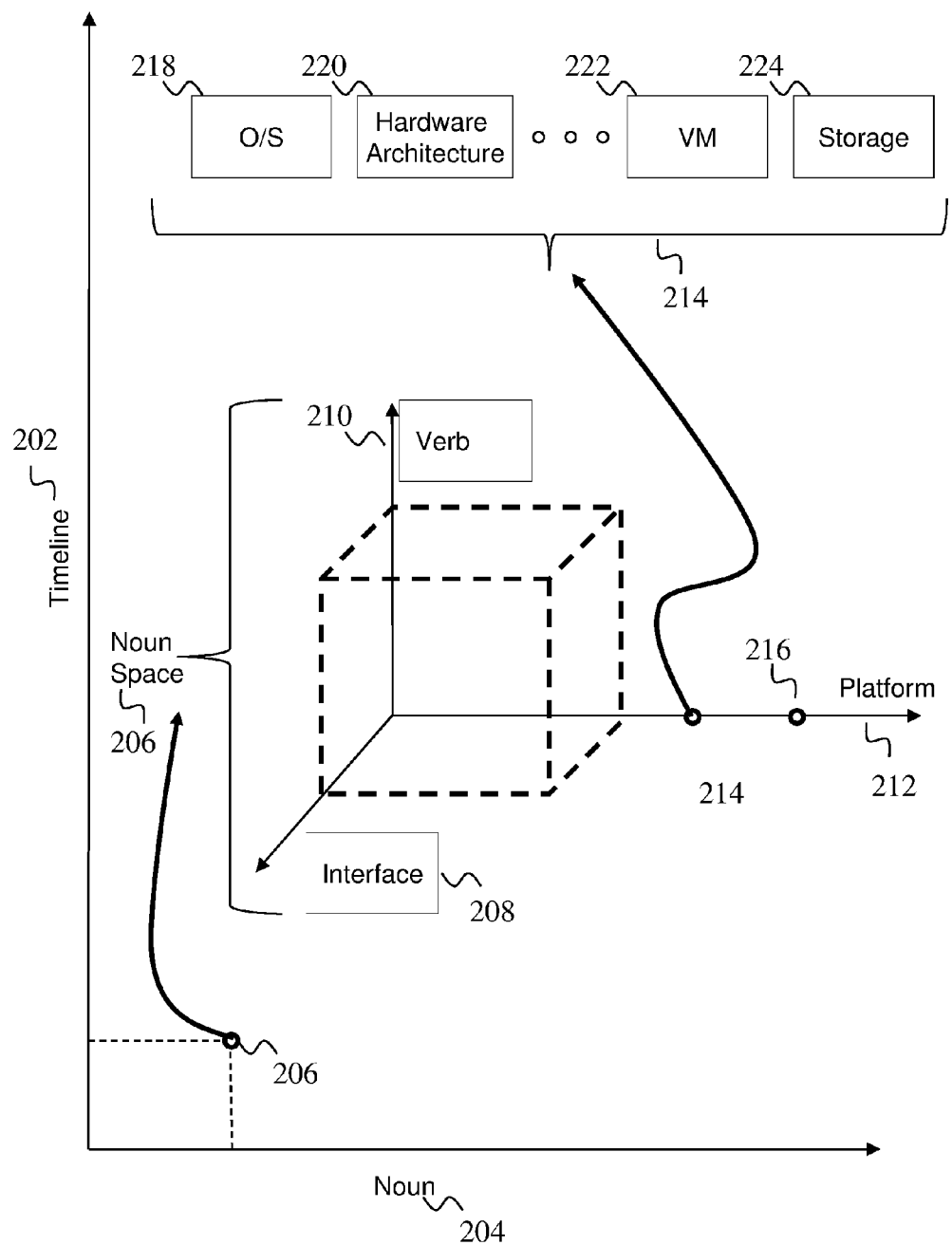
FIG. 2 depicts a visualization of a content space with the addition of environment subspace in an embodiment.

FIG. 2 depicts a visualization of a content space in an embodiment, with the nested platform space shown. The content space may be visualized as points along an axis. The timeline dimension 202 is along one axis and represents the time line of development and requirements, or product releases. The timeline dimension 202 may be represented by release numbers, dates and times, or other designators as would be understood by those of ordinary skill. The noun dimension 204 is along a second axis and represents information abstractions that are experienced by a user of the software, for example, email. A noun space 206 is found at points of intersection between the timeline dimension 202 and the noun dimension 204. The noun space 206 is 3-dimensional and includes all of the intersections with verb dimensions 210, interface dimensions 208, and platform dimensions 212. For a given noun-space, the verbs, interfaces and platform dimension values are chosen appropriately for the noun. Logically, each noun-space is independent of the others.

Platform spaces (214 and 216) occur at points along the platform dimension 212. Each of the platform spaces (214 and 216), such as platform space 214, include the various platform attributes corresponding to the requirements for the software. In an embodiment, the platform space 214 includes an operating system option 218, a hardware option 220, a virtual machine option 222, and a storage option 224. In an embodiment, there is a platform dimension value for each platform space combination. The platform space attributes are based on the requirements, architecture and design considerations.

Figure 3:
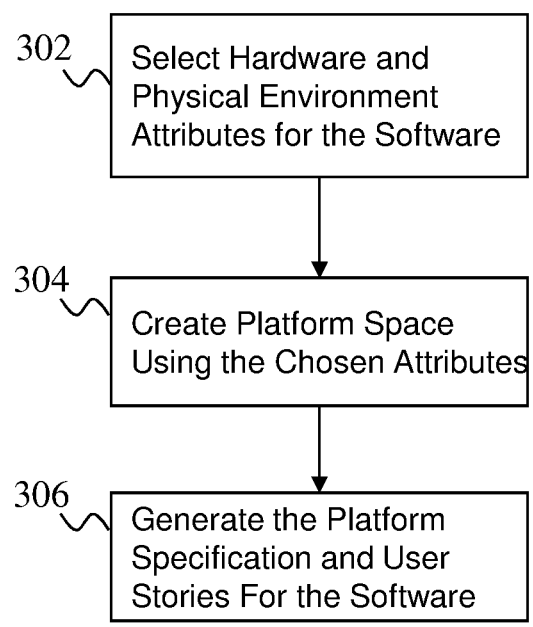
FIG. 3 depicts a process flow for creating a platform space in an embodiment.

FIG. 3 depicts a process flow for creating a platform space in an embodiment. In an embodiment, the process flow of FIG. 3 is executed by the one or more content space environment representation modules 108 of FIG. 1. At block 302, one or more platform attributes are selected for the software described by the content space. In an embodiment, the one or more platform attributes are defined to meet requirements and business demands for the software. Each value on the platform dimension represents a number of valid combinations of platform attributes that are defined specific to the noun-space. The platform attributes may include any operating systems, prerequisite software, computer processing unit (CPU) architecture, storage systems, virtual machine environments, network environments (e.g. wireless, wired, Internet protocol (IP)v4 or IPv6, etc), etc. as determined by architects. For example, for small browser-based applications that include a web page form submission, supported platform attributes includes which browsers and versions will be supported. In an embodiment, the platform attributes may be built as separate downloads to create a group of allowable platform attributes that a user may select from.

The following is an example of how the environment dimension may additionally be specified in the form used by a content space. Two sub-spaces ('platform spaces') are defined, and are labeled 'Power' and 'KVM'. Each is comprised of different sets of attributes that determine the nature of the two environments. Hence, Power has dimensions of operating system (OS), a managed-by system (mb), a kind of management resource feature (RF), a kind of virtual input/output (I/O) system VIOS, and a storage technology. Note that for each of those dimensions a set of values is given.

```
;--------------------------------------------------
; platform spaces
;
platformspace,      Power
dim,                OS, AIX, RHEL, SLES
dim,                mb, HMC, dual-HMC, IVM, SDMC, FRM
dim,                RF, NIM, SCS
dim,                vios, VIOS, VIOS NG
dim,                storage, IBM SAN, IBM XIV, EMC SAN, Hatchi SAN
;
;
;
platformspace,      KVM
sym, kvm_rhel,      KVM RHEL 5.5, KVM RHEL 5.6 & 5.7, KVM RHEL 6.0,
                    KVM RHEL 6.1
sym, kvm_sles,      KVM SLES 11 SP2
sym, kvm_rhev,      KVM RHEV-H Blue 6.0
dim,                storage, SAN, NFS, local file system
dim,                OS, kvm_rhel, kvm_sles, kvm_rhev
```

The KVM environment is defined using different dimensions: KVM from Red Hat (kvm_rhel), KVM from SUSE (kvm_sles), KVM from IBM, storage and operating system supplying KVM (OS).

There are multiple benefits to this approach. Different platforms can be concurrently specified with different relevant dimensions, different platform can be specified with different levels of detail, and the nested platform space is transparently compatible with existing Content Space tooling (as suggested in FIG. 2).

Returning to the form submission application, if a particular browser is only supported on operating system A, then a valid platform attribute includes that browser and the operating system A. If however, the browser is supported on operating system A and B, then the valid platform attributes include both of the combinations of the browser executing on operating system A, and the browser executing on operating system B.

At block 304 a platform space is created for the software. It will be understood that the platform space does not have to include all possible combinations of the valid platform attributes. For example, a browser may operate sufficiently consistently across all operating systems for the purposes of a user story. In this case, only a single combination of browser and operating system may be included in the platform space, or the operating system may be omitted altogether.

At block 306, a platform specification and an associated user story is generated for the software. The platform specification is a conventionalized string representation of the created platform space. In an embodiment, the platform specification is an extensible markup language (XML) document. In an additional embodiment, the platform specification is a JavaScript® object notation (JSON) document. It will be understood that other representations of the platform specification are supported, including but not limited to comma delimited lists, and non-string representations such as object oriented data structures that may be serialized.

In an embodiment, the platform specification is nested within the platform dimension of the content space. Therefore each point in the noun-space platform dimension is a set of values from the n-dimensional platform space. The platform space is defined for each noun-space i.e., it is noun-specific.

It will be understood that the process flow of FIG. 3 is provided for purposes of clarity. In embodiments, one or more of the blocks of FIG. 3 may be omitted, or additional processing may occur between each block as would be understood by those of ordinary skill in the art.

Technical effects and benefits include a convention for selecting platform attributes. An addition benefit is the ability to use the convention mechanism in existing content space tools.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for content space environment representation, the method comprising:
   selecting one or more platform attributes for a software content space, the software content space including one or more noun spaces, wherein each noun space is a three dimensional and includes an intersection of a verb dimension, an interface dimension and a platform dimension;
   creating a platform space for each noun space in the software content space, wherein creating includes selecting one or more platform attributes from a group of preselected platform attributes and selecting a platform value for each of the selected platform attributes wherein the noun space comprises a definition of all valid combinations of the platform values for the selected platform attributes; and
   generating, by a computer, a set of user stories, each of the set of user stories being based on the software content space and a platform specification compatible with existing content space system specifications, wherein the platform specification is a representation of the created platform spaces.

2. The computer implemented method of claim 1, wherein the one or more platform attributes include one or more of:
   an operating system;
   a computer hardware environment;
   a virtual machine environment;
   a hypervisor;
   a network infrastructure; and
   a storage system.

3. The computer implemented method of claim 1, wherein the one or more platform attributes include software executing on an operating system.

4. The computer implemented method of claim 1, wherein the one or more platform attributes are defined in business requirements that define the software content space.

5. The computer implemented method of claim 1, wherein the platform space is a string.

6. The computer implemented method of claim 1, wherein the platform space is a serializable data object.

7. A computer program product for content space environment representation, the computer program product comprising:
   a non-transitory storage medium readable by a processing circuit and storing instructions for execution by the processing circuit for performing a method comprising:
   selecting one or more platform attributes for a software content space, the software content space including one or more noun spaces, wherein each noun space is a three dimensional and includes an intersection of a verb dimension, an interface dimension and a platform dimension;
   creating a platform space for each noun space in the software content space, wherein creating includes selecting one or more platform attributes from a group of preselected platform attributes and selecting a platform value for each of the selected platform attributes wherein the noun space comprises a definition of all valid combinations of the platform values for the selected platform; and generating, by a computer, a set of user stories, each of the set of user stories being based on the software content space and a platform specification compatible with existing content space system specifications, wherein the platform specification is a representation of the created platform spaces.

8. The computer program product of claim 7, wherein the one or more platform attributes include one or more of:

an operating system;
a computer hardware environment;
a virtual machine environment;
a hypervisor;
a network infrastructure; and
a storage system.

9. The computer program product of claim 7, wherein the one or more platform attributes include software executing on an operating system.

10. The computer program product of claim 7, wherein the one or more platform attributes are defined in business requirements that define the software content space.

11. The computer program product of claim 7, wherein the platform space is a string.

12. The computer program product of claim 7, wherein the platform space is a serializable data object.

* * * * *